INTERCOMMUNICATION SYSTEM
Filed May 5, 1964
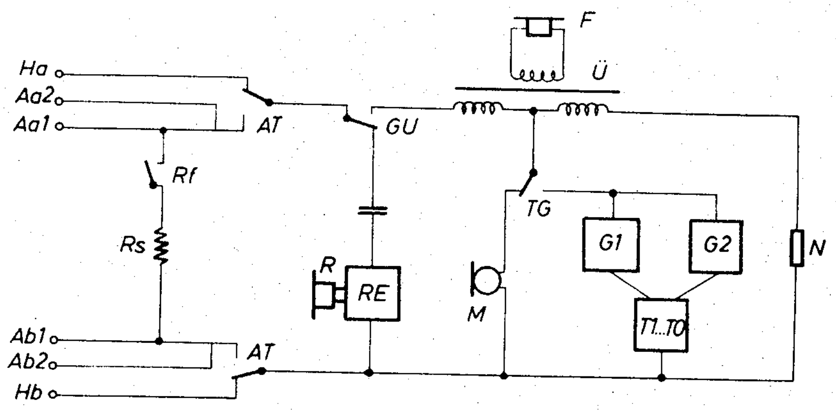
INVENTOR
GÜNTHER RAHMIG
ATTORNEY United States Patent Office 3,345,466
Patented Oct. 3, 1967

3,345,466

INTERCOMMUNICATION SYSTEM

Günther Rahmig, Kornwestheim, Germany, assignor to International Standard Electric Corporation Filed May 5, 1964, Ser. No. 365,037
Claims priority, application Germany, May 29, 1963, St 20,661
5 Claims. (Cl. 179—37)

ABSTRACT OF THE DISCLOSURE

Key type telephone system providing both public utility and intercom connections. The subscriber can selectively connect either with the exchange system or connect directly with other parties of the same intercom system.

The invention relates in general to intercommunication systems and in particular to intercommunication systems using voice-frequency key dialing.

When key dialing is used in intercommunication systems, the individual intercom stations are equipped with a key set of at least ten keys instead of the dial switch. A certain dial figure from 1 to 0 is aligned with each key for use in generating a *vf*-signal code. Each dial signal is transmitted in an impulse. The desired subscriber number is transmitted in this signal code when a call originates from the exchange office. To this end each extension station is equipped with voice-frequency generators, tuned to the respective code. If, for example, each dial signal is determined by two voice-frequencies, two voice frequency generators are provided which can be set to different signal frequencies. The frequency setting of the generators is made in a corresponding manner via the key contacts. Such intercommunication systems have been equipped with line calling circuits, besides the exchange calling circuit, so that the individual extensions can directly intercommunicate. The known intercommunication systems also provide at each substation a number of buttons corresponding to the number of stations in order to call the other extension stations directly. In addition, a separate ringing line and a separate ringing element, e.g. a buzzer, must be provided for each sub-station.

An object of this invention is to provide new and unique intercommunication systems utilizing *v-f* key dialing.

A related object of the invention is to solve the problem of calling the other sub-stations in intercom system with *v-f* key dialing in a simpler way.

Yet another object of the invention is to provide an intercommunication wherein the same components are used either for dialing or intercom signalling.

In accordance with a preferred embodiment of this invention, the sub-station's voice-frequency receivers act as calling elements for the intercommunication call. Therefore, the receivers are tuned to the various voice frequency dial signals generated by the key controlled voice frequency generators of the sub-station. Dialing or intercommunication signals are emitted depending on the relative position of an "exchange button." Thus, the facilities of the station for key dialing are used in a multiple way. Separate intercom calling buttons can be omitted and thereby a standard telephone station with key-dialing facilities and additional exchange buttons and call-back buttons can be used as a sub-station in an intercom system comprising up to ten sub-stations.

The voice-frequency calling receiver for the intercom signal is tuned in each sub-station to the calling signal assigned to the said station. This intercom-call signal is identical with a dial signal. When a two-frequency dial signal is used, a two-frequency receiver is operated as *v-f* ringing receiver. When the system is only partly used for intercom calling, the dial signals assigned to the respective keys can be selected in such a way that they contain at least one different signal frequency. Thereby, the *v-f* ringing receiver can be simplified; only a single frequency receiver is required since only the differing part of the various intercom signals must be evaluated.

These and other objects and features of the invention will now be explained in detail with the aid of the accompanying drawing. On the said drawing only the substation circuit of an extension is shown. The drawing demonstrates in principle the circuitry of a sub-station as designed according to the invention.

The circuitry essentially consists of a transformer U with a matching network N connected to a receiver F, and the microphone M.

When the handset is lifted, the cradle-switch-over contact GU is operated. When the subscriber at the substation handles an exchange call over the trunk line the exchange button AT is operated. The circuits of the station are connected with the terminals A*a*1, A*b*1. The outputs A*a*2, A*b*2 connect to the next succeeding sub-station. Switch R*f* and the resistor R*s* indicate the facilities of known intercom systems used for call-back and disconnecting the other intercom stations from the trunk line.

Through closing of the loop via the sub-station circuit the exchange-calling facility is seized. The subscriber or extension station receives an exchange signal such as dial tone and may start dialing. A generator set comprising generators G1, G2 is provided in the sub-station. The frequency of the generators can be set via the key set with the ten keys T1 to T0 and are transmitted in the sequence desired to transmit the called number to the exchange office. There the frequencies evaluated are used to establish a call. The contacts TG indicate that when operating any arbitrary key the microphone M is switched off and the transmitting facility G1 and G2 is switched on.

A separate ringing current receiver is associated with the trunk line for terminating trunk calls. The said receiver is adapted to the ringing method of the exchange. An alarm bell is used, if the master station is called by an A.C. ringing signal, or a voice-frequency receiver is used if the voice-frequency ringing is applied.

During internal calls the sub-station subscriber also lifts the handset. Via the cradle-switchover contacts GU, and the exchange button AT, the substation circuitry is connected to the internal link H*a*, H*b*. Link H*a*, H*b* is connected to the ringing-tone receiver RE when the substations are inoperative. When the trunk-line key AT is not operated, the ten different frequency combinations can be emitted through the keys T1 to T0 and via the generators G1 and G2. The voice-frequency signals reach the internal link H*a*, H*b* and, consequently, the parallel located ringing-tone receivers RE of the other sub-stations through an isolating capacitor C. A predetermined ringing signal identical with a certain dial signal is associated with each sub-station. Through this means the sub-stations can selectively be called via the internal link H*a*, H*b*.

An electro-acoustical converter R to radiate the ringing signal follows the ringing tone receivers RE. Assuming, for example, a voice-frequency signal code 2*x* (1-out-of-4) each dialing signal is formed by a frequency of the two signal-frequency groups, each consisting of four frequencies. The ringing-tone receivers can in such a case be designed as two frequency receivers. In this manner, up to ten sub-stations can be selectively called. If less than ten sub-stations are provided for an intercom system, e.g. only four, only one frequency of the internal ringing signal need be evaluated. In such a case, single-frequency receivers serving as ringing-tone receivers are sufficient.

The intercommunication system according to the invention is not limited to a certain signal code. The signal code only determines the design of the internal voice-frequency ringing receivers in the different substations. In this respect, the number of the sub-stations connected to the system must be considered. Ideally, an adjustable ringing tone receiver is used which can be set to the different internal link signals and, consequently, dialing signals. Thereby, uniform stations can be designed and the associated internal call number is determined solely by setting the voice frequency ringing receiver.

While the principles of the invention have been described above in connection with specific apparatus and applications, it is to be understood that this description is made only by way of example and not as a limitation on the scope of the invention.

I claim:

1. A voice frequency key dialing equipped trunk line connected intercommunication system having a plurality of internal substations, internal link means for interconnecting said internal substations for intercom purposes, each of said substations having voice signal receiving means and voice frequency signal transmitting means, said voice frequency signal transmitting means capable of transmitting dialing and internal call signals, hookswitch means normally connected to said voice frequency receiving means, means responsive to particular voice-frequency signal received in said receiving means for sounding a signal, means responsive to the operation of said hookswitch for disconnecting said signal receiving means, and means for selectively connecting said voice frequency transmitting means to said internal link means or to said trunk line whereby either trunk dialing or internal call signals are transmitted.

2. In the voice frequency intercommunication system of claim 1 wherein said internal stations each have a second receiver and a microphone for respectively receiving and transmitting voice communications and wherein said voice frequency signal transmitting means comprises means for disconnecting said microphone while said voice frequency signals are transmitted.

3. In the voice frequency intercommunication system of claim 2 wherein said voice frequency signal transmitting means comprises a plurality of generator means, and key means for setting the frequencies of said generator means to form a signalling code to signal a desired internal or trunk line station.

4. In the voice frequency intercommunication system of claim 3 wherein said plurality of generators comprises two signal generator for generating a two frequency signal and wherein said signal receiver is a two signal receiver.

5. In the intercommunication system according to claim 4, wherein only a part of the dialing keys are jointly used as internal call keys, and that the dialing signals associated to said keys contain at least one differing signal frequency.

References Cited

UNITED STATES PATENTS

| | | | |
|---|---|---|---|
| 1,992,389 | 2/1935 | Moser | 179—37 |
| 2,658,110 | 11/1953 | Lomax | 179—17.6 |
| 3,036,163 | 5/1962 | Bachelet | 179—1.4 |
| 3,200,205 | 8/1965 | Herter | 179—84 |
| 3,210,479 | 10/1965 | Engelschall | 179—84 |

KATHLEEN H. CLAFFY, *Primary Examiner.*

H. ZELLER, *Assistant Examiner.*